United States Patent [19]

Eastman et al.

[11] 4,309,986
[45] Jan. 12, 1982

[54] SOLAR HEATER

[75] Inventors: George Y. Eastman, Lancaster; Donald M. Ernst, Leola; Warren E. Thomas, Lancaster, all of Pa.

[73] Assignee: Thermacore, Inc., Lancaster, Pa.

[21] Appl. No.: 113,773

[22] Filed: Jan. 21, 1980

[51] Int. Cl.³ .............................................. F24J 3/02
[52] U.S. Cl. .................................... 126/433; 126/432; 126/435; 126/437; 165/104.21
[58] Field of Search ............... 126/433, 437, 435, 443, 126/438, 427; 165/105, 104.21; 417/207, 118; 237/60

[56] References Cited

U.S. PATENT DOCUMENTS

| | | | |
|---|---|---|---|
| 524,718 | 8/1894 | Jencks | 417/118 |
| 2,707,593 | 5/1955 | Woodcock | 237/60 |
| 3,250,269 | 5/1966 | Sherock | 126/435 |
| 3,390,672 | 7/1968 | Snelling | 126/433 |
| 4,004,573 | 1/1977 | Frieling et al. | 126/435 X |
| 4,059,093 | 11/1977 | Knowles et al. | 126/433 |
| 4,165,952 | 8/1979 | Bennett | 417/207 |
| 4,224,925 | 9/1980 | Movick | 126/427 |

FOREIGN PATENT DOCUMENTS 2725488 12/1978 Fed. Rep. of Germany ...... 126/433

*Primary Examiner*—Larry Jones
*Attorney, Agent, or Firm*—Martin Fruitman

[57] ABSTRACT

A self-pumping solar liquid heating system which includes two solar collectors, a high temperature collector for generating vapor which expands and pumps fluid through the system, and a separate collector for collection of heat of utilization. A heat pipe transfers the heat from the high temperature collector to a vapor generator pump which moves the liquid in series through the second collector, a heat load and a liquid reservoir. Mechanical temperature controls are used to regulate the temperature of the heat load so no electrical power is required for the system.

8 Claims, 2 Drawing Figures

SOLAR HEATER

BACKGROUND OF THE INVENTION

This invention relates generally to a solar furnace and more specifically to a liquid heating solar furnace which is self-pumping by means of a vapor generator pump.

While there exist, both in the literature and commercially, solar heat collection systems which do not require external power to pump the heat transfer fluid to a hot water tank or heat exchanger, such systems depend on natural convection currents and differing elevations, and are thereby limited in the distance and particularly in the height they can move the heated liquid.

The typical residential structure requires a lift of the heat transfer liquid of at least ten feet, and, for a two-story house with attic, requires approximately twenty-five feet. Such heights make convection flow impractical and invariably lead to the use of electric pumps for liquid movement. Not only is this philosophically distasteful to most persons who are interested in the use of solar energy, but it limits the use of solar heating to locations where electrical power is available, and thereby is counterproductive to solar energy's greatest benefit, independence from commercial power sources.

It is therefore the object of this invention to furnish a heater for liquids which is powered only by solar energy and which requires no outside source of power for pumping the liquid.

A further object of the present invention is to supply a solar heating system which has independent solar collectors for heating and for pumping the heat transfer fluid.

A still further object is to yield a solar heating system which, not only pumps liquid without auxilliary sources, but is also capable of circulating heated water throughout all areas, including the upper floors, of a residence.

A further object of the invention is to permit optimum location of the solar pumping collector and vapor generator pump, and, through the use of a heat pipe, eliminate the requirement that they be in close proximity.

A still further object is to furnish a solar heating system with simple controls which operate without external power sources, and which maintain required water temperature but prevent overheating.

SUMMARY OF THE INVENTION

The objectives are obtained by use of the present invention in which a vapor generator pump, heated by solar radiation, is used to provide motive force to a solar heating system.

The vapor generator pump is heated by means of a heat pipe which efficiently transfers high temperature heat from a high temperature solar collector. The use of the heat pipe permits independent location of the high temperature solar collector and the vapor generator pump in locations which are most advantageous for their individual function. The use of the heat pipe also permits collection at the solar collector and transfer to and concentration of heat flux within the vapor pump.

The vapor generator pump is fed from a reservoir tank located higher than the pump so that the pump will be filled with heat transfer liquid from the pressure head in the reservoir. With the vapor generator pump filled with liquid and heated by the heat pipe, liquid is forced from the pump by vaporizing a portion of the liquid and can move considerable distances and heights. In a typical residence this could involve the distance from the roof to basement, where a water heating and storage tank is located, and back up to the roof.

The heat transfer liquid first leaving the vapor generator pump has, of course, been heated by the action of the pump, but depending on the way the heat is utilized, this heating may not be sufficient in many applications. To accommodate the need for greater heat, a second solar collector is used in the present invention. To minimize costs, because the temperatures required for residential hot water use are easily secured by its use, a flat plate collector is used in the preferred embodiment, but other types of solar collectors are also suitable.

In order to utilize the benefit of a greater temperature differential across a low temperature collector, the present invention also includes the option of cooling the heat transfer fluid before it enters the flat plate collector. This can be accomplished by passing the liquid, after it leaves the vapor generator pump, through an auxilliary heat exchanger, thus using the pump heat to help accomplish the main goal of the solar heating system. The heat transfer liquid, once cooled by the auxilliary heat exchanger, is then passed through the flat plate solar heater for reheating and then, in the typical application, to the hot water tank to complete the task of heating the water. A liquid to liquid heat exchanger within the hot water tank is used to heat the water and cool the heat transfer liquid coming from the flat plate solar collector. After passing through this heat exchanger in the hot water tank, the heat transfer liquid is moved, still by the pressure of the vapor generator pump, into the reservoir for recycling.

Several alternate embodiments for control of the system are included in the invention. One is the capability of reducing the heat input to the water heater for mere maintenance of temperature when only system heat losses are being compensated for. This can be accomplished by a simple mechanical type thermostat, operating at a prescribed upper temperature, along with a pressure sensitive valve, which together shut off water to the heat load but open a bypass path, and thereby reduce the heat input into the hot water tank.

The system can therefore operate completely independent of auxilliary power and accomplish not only water heating, but also regulation of water temperature to desired temperature.

DETAILED DESCRIPTION OF THE INVENTION

Figure 1:
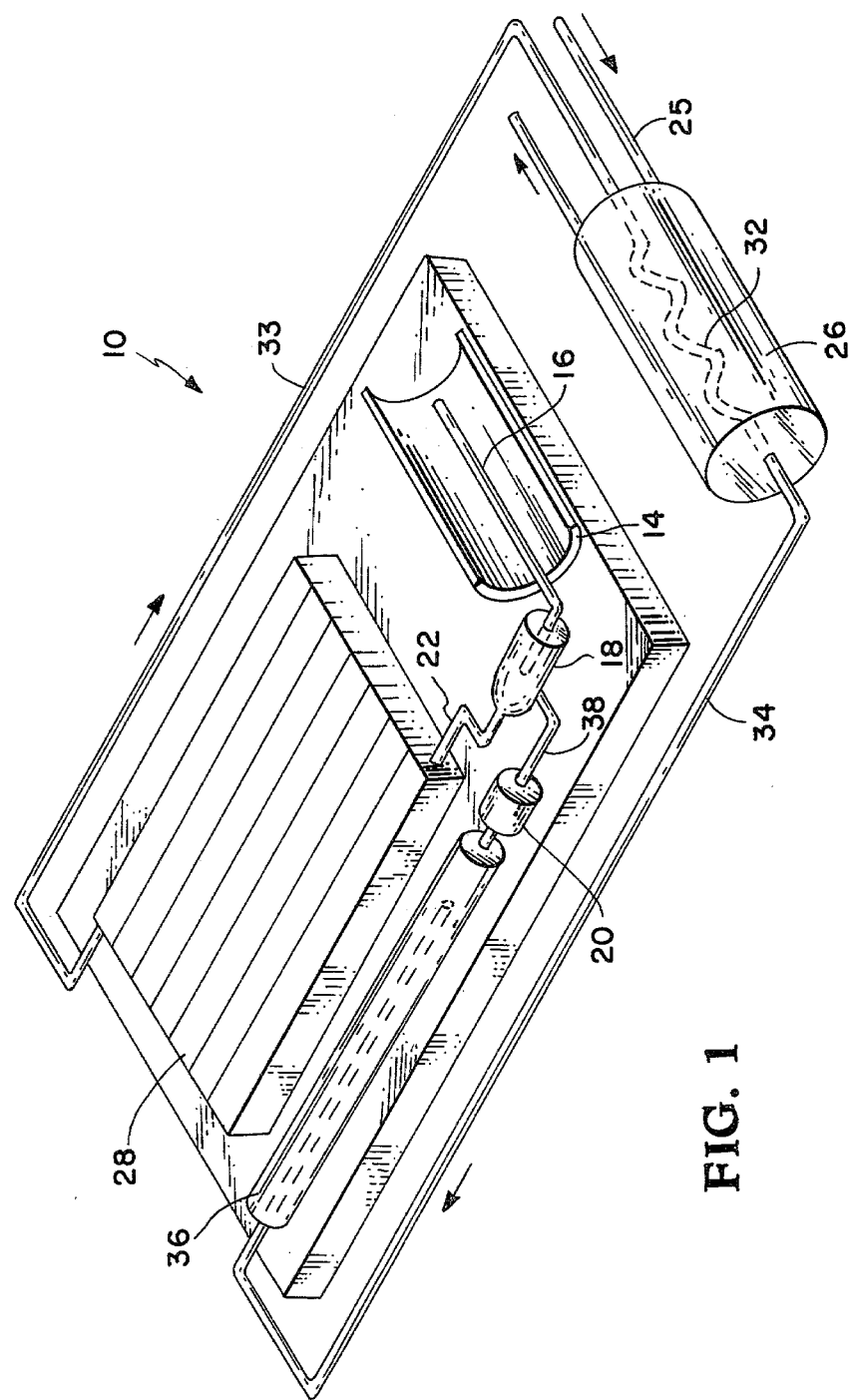
FIG. 1 is a schematic diagram of the preferred embodiment of the invention in its simplest form.

FIG. 1 is a schematic representation of the preferred embodiment of the invention in which solar heating system 10 uses solar radiation to both heat and pump the liquid.

Solar radiation impinges upon high temperature solar collector 14 and is focused onto heat pipe 16 which transfers heat of a temperature higher than the heat transfer liquid boiling point to the heat transfer liquid within vapor generator pump 18. Vapor generator pump 18 operates by causing bubbles of vapor to form. The bubbles expand, pushing ahead of them the liquid, and, due to the increase in local pressure, check valve 20 closes and the liquid is pushed through pipe 22. By means of this pumping action, liquid is cyclically pumped through solar heating system 10.

After leaving vapor generator pump 18 the heat transfer liquid passes through pipe 22 to flat plate collector 28.

Flat plate collector 28, heated by solar radiation, heats the heat exchanger liquid to a temperature appropriate for utilization in the application selected, and the liquid is pumped to heat exchanger 32 within tank 26 by way of pipe 33. As the cooled liquid leaves tank 26 it is pushed through pipe 34 by the pumping pressure. The liquid is then returned to reservoir tank 36. Tank 36, located higher than pump 18, is used, along with check valve 20 and pipe 38, to assure that pump 18 is constantly supplied with liquid for its vapor generation. Check valve 20 permits water to enter pump 18 during pressure lapses caused by the cyclic nature of vapor pump operation.

While this preferred embodiment shows and describes a particular sequence of devices, the invention only requires series liquid flow. Flat plate collector 28 can, for instance, precede reservoir 36 in the sequence and vapor pump 18 would therefore pump directly to heat exchanger 32.

Figure 2:
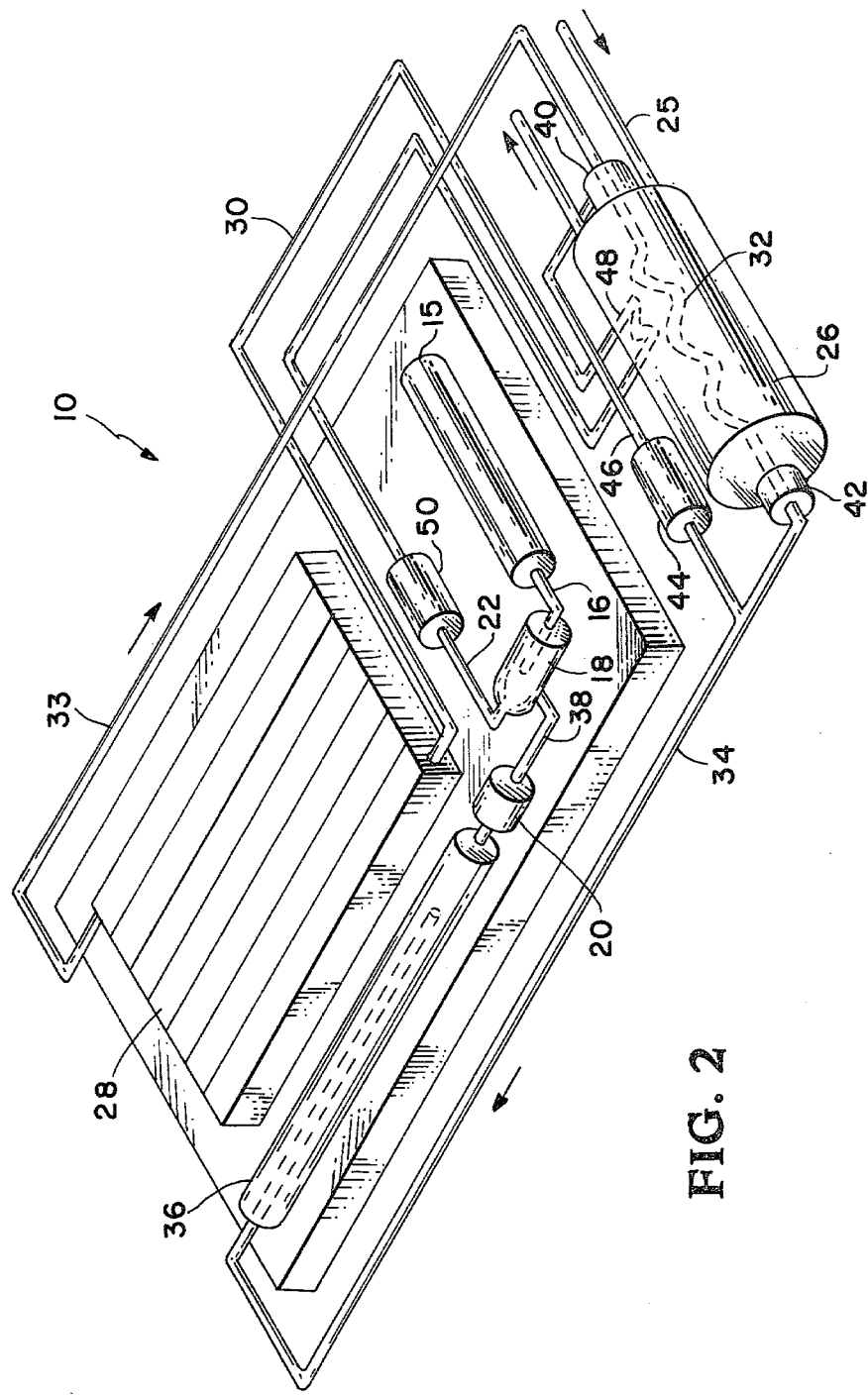
FIG. 2 is an alternate embodiment of the invention which includes controls to regulate heat load temperature.

FIG. 2 shows an alternate embodiment of solar heater 10 which contains thermostatically controlled valves 40 and 42 for regulation of the temperature of water within hot water tank 26, and back pressure valve 44 for by-passing hot water tank 26, and also depicts an evacuated tube contruction for high temperature collector 15.

FIG. 2, which uses the same number designations for parts as FIG. 1 where applicable, shows the added features of tank input thermostat 40, bypass pipe 46 and tank output thermostat 42. Thermostat 40 is designed to open only when the liquid in pipe 33 is hotter than the liquid in tank 26, and thermostat 42 functions to close when a desired temperature is reached.

With the other portions of the embodiment of FIG. 2 functioning in the same manner as the embodiment of FIG. 1, thermostat 40, controlled by the temperature of tank 26, operates to close off tank 26 as long as the water of tank 26 is higher in temperature than the water available from pipe 33, thus preventing the tank from being cooled by water unheated by solar power. Bypass pipe 46, with pressure sensitive valve 44, is, however, available to permit liquid to circulate within solar heater 10 while it is increasing in temperature to the level at which it will add heat to tank 26.

Bypass valve 44 placed in line 46 operates to prevent bypass operation when heat is flowing into tank 26. Valve 44 is essentially a spring-loaded closed valve which is pressure sensitive. When either thermostat valve 40 or 42 blocks the liquid flow through heat exchanger 32 and the pressure caused by vapor generator pump 18 is not relieved by a path to reservoir 36 through heat exchanger 32, the pressure causes valve 44 to open and liquid flows through bypass pipe 46.

Thermostatic valve 42, in output line 34 of tank 26, functions as a high limit on tank 26 temperature. When the tank output temperature reaches a prescribed temperature, valve 42 closes, thus preventing any further heat transfer to tank 26. As tank 26 cools valve 42 opens and permits heating.

When thermostat 42 prevents heat transfer to tank 26 the self-limiting operation of the system comes into operation when water temperature in the high temperature collector continues to rise. Continued solar exposure in a solar collector, without cooling of liquid, causes a condition referred to as stagnation, where the internal temperature limits further collection of heat. Similarly, overheating of the vapor pump simply stops the pumping because all liquid in the pump is vaporized. When the temperature of liquid is lowered after such a condition, the vapor in the pump is simply condensed into liquid and the energy collection begins again.

FIG. 2 also shows an optional system of increasing the efficiency of flat plate solar collector 28 by supplying it with liquid of lower temperature. This is accomplished by cooling the liquid as it leaves vapor pump 18 by pumping it through auxilliary heat exchanger 48 in tank 26. The liquid leaving vapor pump 18 is thus cooled before being returned to flat plate solar collector 28 for reheating, but the heat is used to help heat the water in tank 26.

It is understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example, other heat transfer methods suitable for high temperature, such as thermosyphon pumps, could be used in place of the heat pipe, and the vapor pump and high temperature collector could be remote from the flat plate collector. Also, additional check valve 50, as well understood in the art of vapor pumps, can be added to improve operation of vapor pump 18. Furthermore, high temperature collectors other than the radiation-concentrating or the evacuated tube collectors pictured could be used.

Further variations can occur in the use of a closed and evacuated pipe system, instead of the system as depicted which is open to atmospheric pressure, which would reduce boiling temperatures.

What is claimed as new and desired to be secured by Letters Patent of the United States is:

1. A self-pumping solar heater for liquids comprising:
   a reservoir containing a heat transfer liquid;
   a check valve connected to the outlet of the reservoir;
   a vapor generator pump with inlet connected to the check valve, located at a lower liquid head than the reservoir, and capable of pumping the heat transfer liquid by vapor action;
   a first solar collector, capable of producing temperatures high enough to vaporize the heat transfer liquid;
   a heat pipe included in said first solar collector and connected between the first solar collector and the vapor generator pump and capable of conducting heat from the first solar collector to the vapor generator pump for maintaining temperatures at the vapor generator pump which vaporize the heat transfer fluid and permitting independent and remote location of the first solar collector from the vapor generator pump;
   a second solar collector connected in series with the vapor generator pump and the reservoir;
   a main heat exchanger connected in series with the second solar collector, the reservoir, and the vapor generator pump, and constructed to transfer heat to a heat load; and return flow means connected in series with the reservoir, the second solar collector, the vapor generator pump, and the main heat exchanger for returning heat transfer liquid from the main heat exchanger to the reservoir to be reheated.

2. A self-pumping liquid solar heater as in claim 1 wherein the first solar collector is a radiation concentrating collector.

3. A self-pumping liquid solar heater as in claim 1 wherein the first solar collector is an evacuated tube collector.

4. A self-pumping liquid solar heater as in claim 1 further comprising an auxilliary heat exchanger inserted in series between the vapor generator pump and the second solar collector, and designed to cool the heat transfer liquid before entry into the second solar collector while adding heat to a heat load.

5. A self-pumping liquid solar heater as in claim 4 wherein the auxilliary heat exchanger is constructed to heat the same load as the main heat exchanger.

6. A self-pumping liquid solar heater as in claim 1 wherein the second solar collector is a flat plate solar collector.

7. A self-pumping liquid solar heater as in claim 1 further comprising a thermostatically controlled and activated mechanical bypass means which automatically bypasses liquid flow around the heat load when the output temperature of the solar heater is lower than the temperature of the heat load.

8. A self-pumping liquid solar heater as in claim 1 further comprising a thermostatically controlled and activated mechanical bypass means which automatically bypasses liquid flow around the heat load when the heat load temperature is higher than a predetermined temperature.

* * * * *